United States Patent
Batten et al.

(10) Patent No.: US 9,830,301 B1
(45) Date of Patent: Nov. 28, 2017

(54) PREDICTIVE SERVICE REQUIREMENT ESTIMATION FOR PHOTOVOLTAIC ARRAYS

(71) Applicant: SunPower Corporation, San Jose, CA (US)

(72) Inventors: Robert Batten, Tualatin, OR (US); Ravindranath Naiknaware, Portland, OR (US)

(73) Assignee: SunPower Corporation, San Jose, CA (US)

( * ) Notice: Subject to any disclaimer, the term of this patent is extended or adjusted under 35 U.S.C. 154(b) by 639 days.

(21) Appl. No.: 13/645,062

(22) Filed: Oct. 4, 2012

Related U.S. Application Data

(60) Provisional application No. 61/543,291, filed on Oct. 4, 2011.

(51) Int. Cl.
*G06F 17/00* (2006.01)
*G01W 1/00* (2006.01)

(52) U.S. Cl.
CPC ............... *G06F 17/00* (2013.01); *G01W 1/00* (2013.01)

(58) Field of Classification Search
None
See application file for complete search history.

(56) References Cited

U.S. PATENT DOCUMENTS

| | | | |
|---|---|---|---|
| 7,172,386 B2 | 2/2007 | Truong | |
| 8,239,149 B2 * | 8/2012 | Nuotio et al. | 702/65 |
| 2005/0045224 A1 | 3/2005 | Lyden | |
| 2009/0066357 A1 * | 3/2009 | Fornage | H02S 50/10 324/764.01 |
| 2009/0160259 A1 * | 6/2009 | Naiknaware | H02M 7/4807 307/82 |
| 2010/0295383 A1 | 11/2010 | Cummings et al. | |
| 2011/0066401 A1 * | 3/2011 | Yang | G01J 1/4228 702/184 |
| 2011/0276269 A1 | 11/2011 | Hummel | |
| 2012/0084027 A1 * | 4/2012 | Caine | H02S 50/10 702/58 |

* cited by examiner

*Primary Examiner* — Paul D Lee
*Assistant Examiner* — Mark Crohn
(74) *Attorney, Agent, or Firm* — Grasso PLLC

(57) ABSTRACT

A method of determining whether service is needed on a solar array includes gathering current data with regard to current solar array performance and environmental conditions, collecting weather data, accessing a storage for historical performance data, using the current data, weather data and historical data to generate a predicted performance, comparing the predicted performance to the current solar array performance data to determine if service is needed and generate comparison data, and analyzing the comparison data to determine a type of service needed, if service is needed.

20 Claims, 4 Drawing Sheets

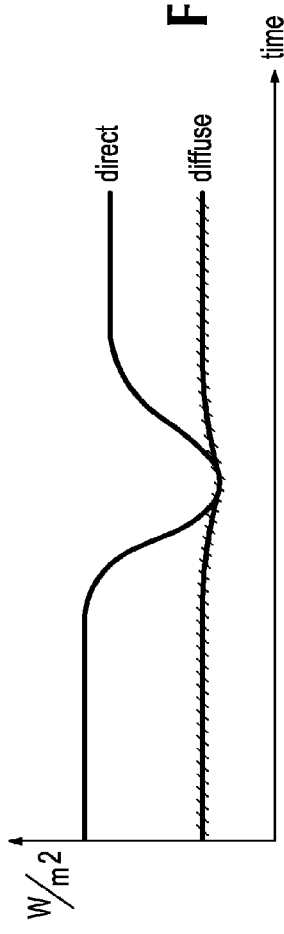
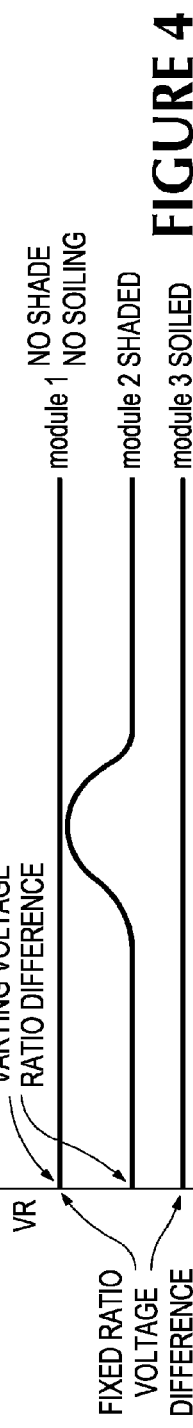
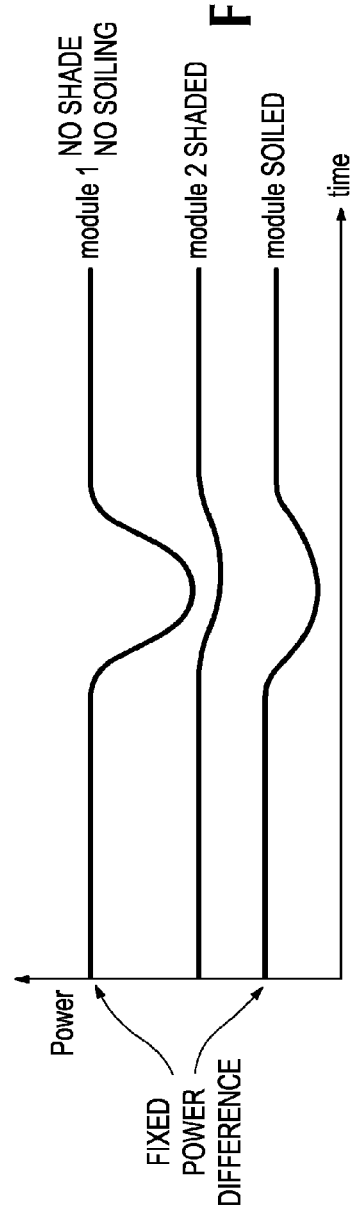

PREDICTIVE SERVICE REQUIREMENT ESTIMATION FOR PHOTOVOLTAIC ARRAYS

RELATED APPLICATION

This application claims benefit of U.S. Provisional Patent Application Ser. No. 61/543,291 entitled "Predictive Service Requirement Estimation for Photovoltaic Arrays," filed Oct. 4, 2011, which is incorporated by reference.

BACKGROUND

Solar photovoltaic modules of solar arrays may suffer from mismatch conditions relative to each other because of one or more of the following mechanisms. A solar array is made up of one or more modules, and the modules may be connected together in one or more strings within the array. Varying shadowing with varying intensity may exist on different parts of the solar array in actual installations. Temperatures may have non-uniform distributions across the solar array. Debris, such as bird droppings, particular accumulation due to dust and other pollutants may soil the panels in a non-uniform manner. Manufacturing processes may result in variations across panels and the panels may age differently.

In traditional systems, where each of the solar modules in a string is connected in series, such mismatches lead to degraded performance of total energy harvest. In a typical environment, it has been demonstrated that such shadowing and mismatch related issues lead to up to 25% of lost energy. Recently, various technologies have been developed to solve these problems. In particular, Microinverter and Power Optimizer technologies improve the system performance by embedding electronics close to each of the solar panels. In the case of microinverters, the energy harvested from the individual solar module is converted to AC, which is suitable for directly feeding into the power system grid. In case of the power optimizer, each of the solar modules consists of a DC-DC converter. The outputs of the DC-DC converters are then connected in series to form solar strings, which are then fed into a centralized inverter for converting to AC suitable for feeding into the grid.

In either case of the microinverters or power optimizers, the individual solar modules are decoupled from each other, and are operated at their maximum power point allowing maximum possible energy harvest. Each of the solar modules in this event can have their individual maximum power point due to their own individual operating condition specific to the extent to which the solar module is soiled or shadowed. Irrespective of the implementation of these technologies, soiled arrays continue to perform sub-optimally with respect to the un-soiled arrays.

Certain shadows and their movements over the year are sometimes pre-known during design and installation due to static structural elements surrounding the arrays. However, in a majority of the situations the shadowing elements are semi-static. Some examples include shadowing due to various factors such as growing trees, slow accumulation of dust or particulate pollutants, random non-uniform bird droppings, and falling debris. Resolution of the majority of the semi-static shadowing requires a variety of service crews to physically reach the array and perform the required maintenance.

Depending on the type of shadowing mechanism, the service crew needed can be different. For example, a growing tree must be cut by a certified landscaping professional, versus particulate accumulation on the solar arrays that must be removed by solar panel cleaning services. The former can be performed without ever touching the arrays, thus the service crew need not have certification and/or knowledge to complete the service. However, the latter needs physically accessing the arrays, and thus may need to be performed by a crew having at least the operational know-how and safety issues of the solar arrays. In such situations, one can anticipate different cost structure associated with different types of service requests. Thus, it becomes imperative to cost effectively and preferably automatically determine if a service request is required, and if required, determine the type of the service request so that appropriate service professional can be sent.

BRIEF DESCRIPTION OF THE DRAWINGS

FIGS. 3-5 show graphs of differences in output of different modules in different situations.

DETAILED DESCRIPTION OF THE EMBODIMENTS

The microinverter and power optimizer technologies mentioned above provide further advantage by allowing module level diagnostics and monitoring. Each of the modules can have bi-directional communication capability using either power-line, wireless or traditional wire-line communication technologies. This allows diagnostics and monitoring of various parameters associated with each of the modules and the corresponding electronics. In some cases, the module integrated electronics can just have communication, diagnostic, monitoring and safety features. In such cases, the module electronics are not capable of performing power conditioning for decoupling the solar array string from the module, however, they can continue to perform key capabilities for service call prediction.

Figure 1:
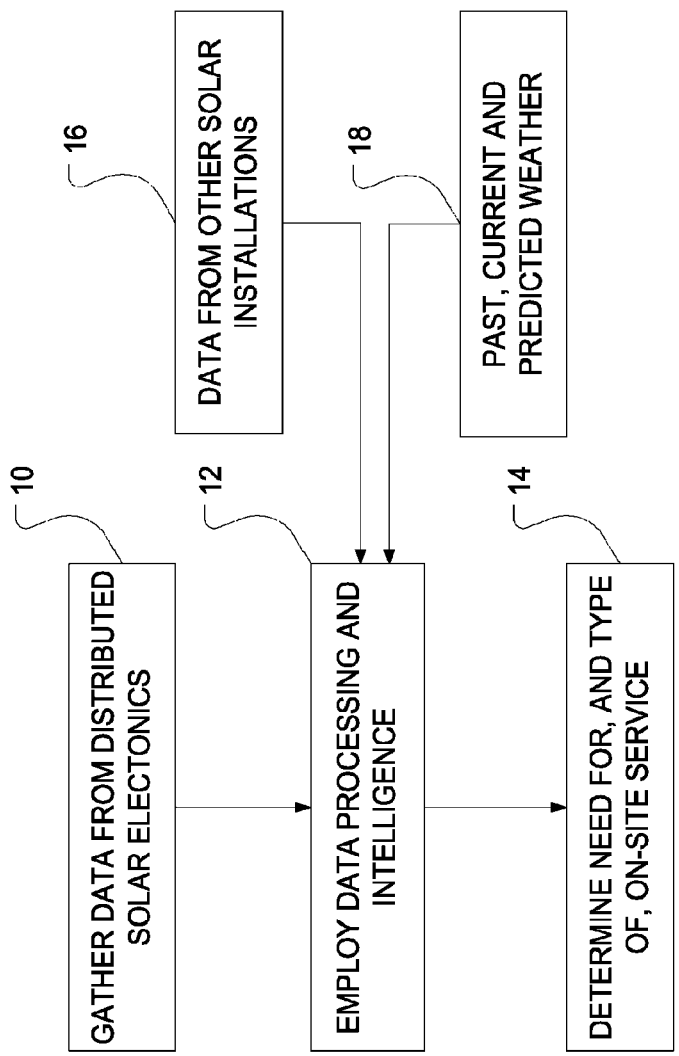
FIG. 1 shows an embodiment of a method of determining services needed for a solar array.

FIG. 1 shows an overview of an embodiment of a method of gathering data relative to the solar array and making a service determination. The process initially gathers data from the distributed solar electronics connected to the solar arrays at 10. This provides data as to the operating output and environment of the solar arrays. In addition, data from other solar installations, either near the current solar installation, operating in a similar environment, and/or having similar characteristics as the current solar installation is gathered at 16. In addition, photovoltaic modules in the solar array depend on the weather, such as the amount of sunshine, the temperature, etc. Therefore, weather information both current, historical and predicted information is gathered at 18. The process employs data processing and intelligence in a controller at 12 to determine whether or not there is a need for service and if so what type, at 14.

The embodiments here describe several novel predictive methods to determine the extent of soiling and shading. Based on these determinations, appropriate service requests or alerts are generated. The inventive principles apply to microinverters, power optimizers, and module-level metering units. The core algorithm to accomplish this as described in FIG. 2. Many elements of the algorithm are exemplary and depending on the situations can be readily changed, curtailed, extended and fine-tuned to accommodate various scenarios described throughout this discussion.

The static design scenario is known, and may include none, some, or all of the following elements: GPS location; installation topography; location of the modules; series parallel string combination; string layout; orientation of the modules; individual module characteristics; location specific, static, shadowing object profiles; and historical irradiation data for the location. There may also be real-time, or almost real-time, availability of the following: data from solar module electronics; data from other solar power plants; available voltage, current, and temperature; available control loop and other parameters such as voltage ratio; available temperature from the smart modules; current irradiation at the solar array using a pyranometer; current temperature at the solar array; current weather meteorology data at the neighboring weather stations.

Figure 2:
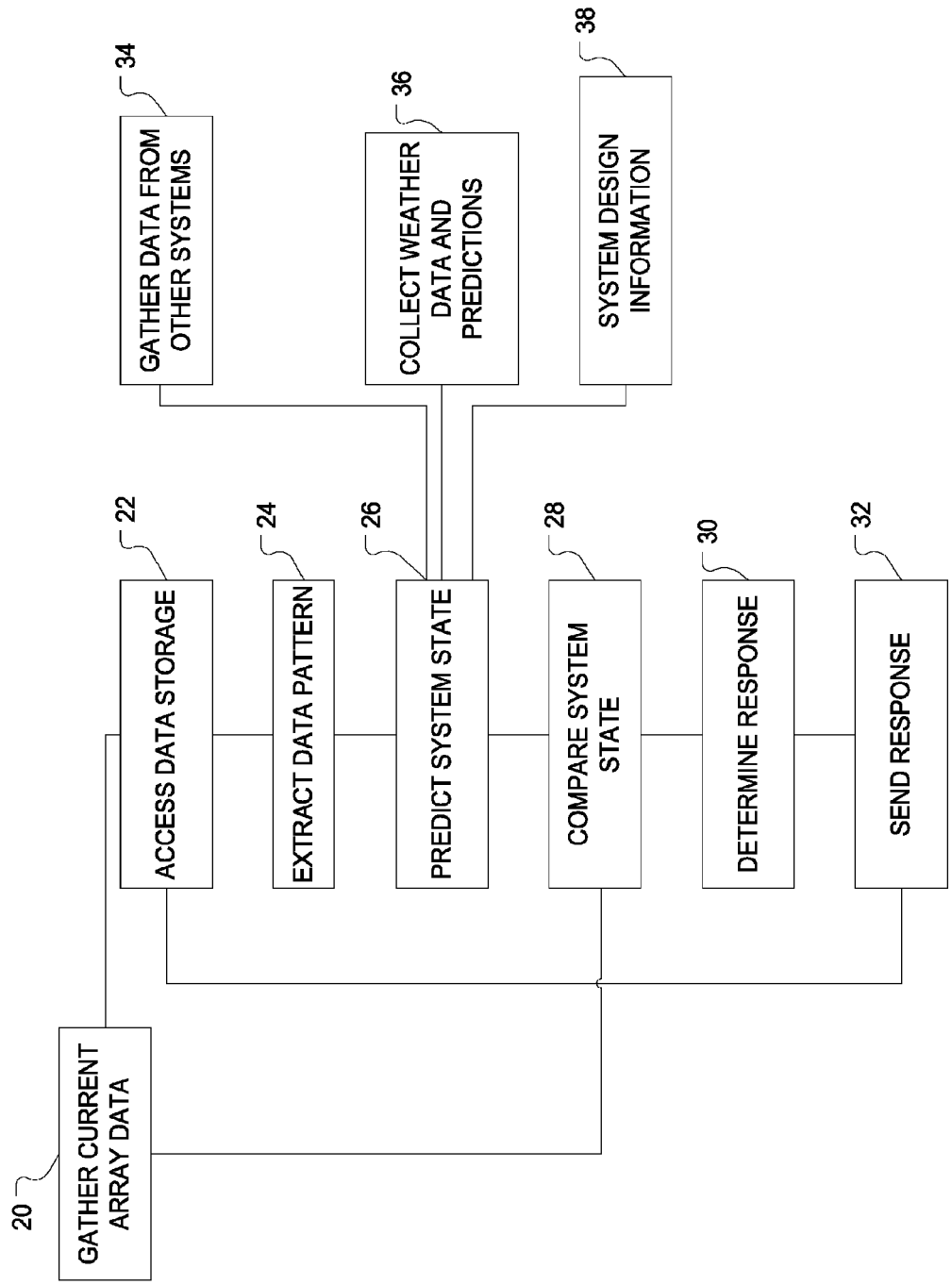
FIG. 2 shows an embodiment of a method of determining an extent of service needed for a solar array.

The process set out in FIG. 2 may gather data and respond over a duration determined by the user or manager of the site. Data is gathered relative to the current array at 20, other systems at 34, weather data is determined at 36 and the system design information is also gathered. Using the current array data, the historical performance of the array can be accessed from data storage at 22. This allows determination of the expected energy harvest at 24 by extracting data patterns using historical performance data, measured pyranometer and temperature data and available installation parameters for each of the modules and for the entire solar array. This process then determines the expected energy harvest by predicting the system state at 26.

The current array data from 20 allows determination of the actual energy harvest using measured data. This is used at 28 to normalize the measured data with respect to measured irradiation, temperature and the shadow profile. Similarly, the process normalizes the expected energy harvest with respect to measured irradiation, temperature and the shadow profile. As part of the comparison of the predicted and actual system states and energy harvests, a scaling vector using singular value decomposition (SVD) is determined. When the scaling vector is applied the difference between estimated and measured energy harvest is a minimum. The scaling vector can then be used to determine the time dependent envelop using one of many techniques, such as absolute value, energy square, Shannon entropy Shannon energy, Teager's energy operator, and analytic signal estimation. The process may apply a low pass filter to the available time dependent energy envelop vector to remove noise from the estimator.

The process can then determine if service is need by using the following exemplary condition:
if sum (norm2 (energy envelop vector)) >given threshold)
{Service is needed=True;
}
The process then determines the kind of service needed at 30, such as by using the following exemplary condition:
if (service is needed) {
if (energy envelop vector is periodic per day and growing)
{
Systematic slow shadow encroachment due to growing features such as Trees
}
if (norm2 (derivative (energy envelop vector)) is greater than given threshold {
if (specified duration is large)

Likely energy harvest reduction due to dust accumulation and pollutants
}
if (specified duration is small) {
Likely energy harvest reduction due to fallen debris such as bird droppings and leaves
}
}
}

In many cases, not all data will be available, so in such cases best available estimates can be used. For example, if the local temperatures of the panel are not known, the procedures can use temperatures available from the nearest weather station. In addition to which a set of embedded corrective factors may also be used. In some cases, a pyranometer may not be installed. In such cases, the best performing module at any time instant can be used as a reference and mimic the behavior of a pyranometer. Similar to temperature estimation based on weather station data, irradiation information may similarly be obtained.

In the most adverse conditions, the static design scenario in unknown. In such an event, correlation information is first established among the panels to determine the nature of systemic shadowing. Next, the algorithm can proceed in a similar way to the prior approach. A few other approaches can determine the worsening output by determining the power output by correlating with the solar plants in nearby areas. A gradual stand alone as well as relative decline in performance of 0.1 to 1% range would imply uniform soiling due to mechanisms such as dust and pollutants accumulation. Similar to the method described in earlier sections, in the absence of local pyranometer, data from various weather stations can be used to determine the solar intensity.

Gradual degradation of power output of one module compared to others in the system may signify dirt or debris build up on one of the panels. The rate of output change could be between 0.1 to 1% per month. Instantaneous degradation of power output of one module compare to others in the system while consistent poor performance after the event may signify sudden accumulation of debris, such as bird droppings, and output would remain reduced.

Some techniques to determine if the module is uniformly or non-uniformly shaded could use variations in how the voltage ratio used by the power optimizers changes during direct as well as diffused sunlight. Under diffused light conditions soiled modules show little or no variation in the voltage ratio, as seen in FIG. 3. However, shaded modules show drastic change in the voltage ratio, shown in FIG. 4. In addition to this, the power difference associated with these modules enables determination of non-uniform soiling vs. increased shadowing, as shown in FIG. 5.

Figure 6:
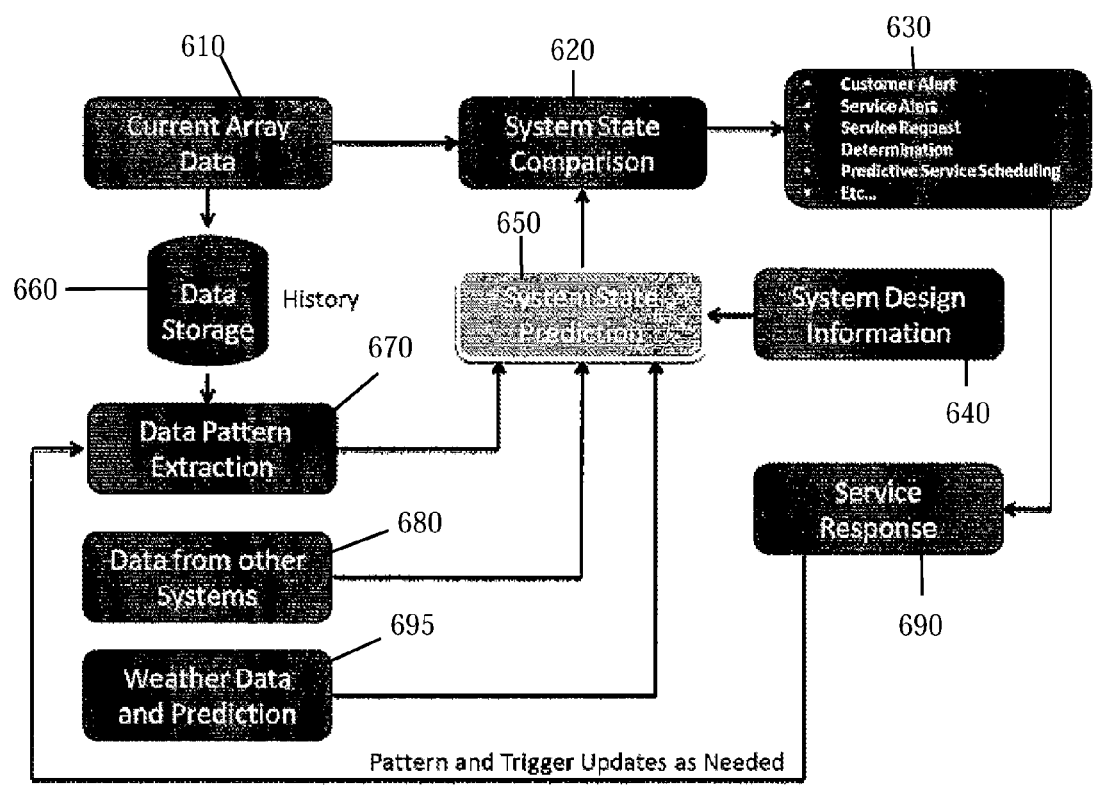
FIG. 6 shows a flowchart of predictive methods.

FIG. 6 shows a flowchart of predictive methods. Labelled in FIG. 6 are current array data 610, system state comparison 620, alerts-requests-scheduling indications 630, system design information 640, system state prediction 650, data storage history 660, data pattern extraction 670, data from other systems 680, and weather data and protection 695. As can be seen in FIG. 6, communication flows, shown by arrows, can be employed between various elements of predictive methods. The communication arrow between 690 and 670 indicates that 690 may send pattern and trigger updates to 670 on an as needed basis.

FIG. 6 is exemplary of predictive methods. Based on these determinations, appropriate service requests or alerts are generated as shown or as otherwise described herein. These predictive methods can be applied, for example, to microinverters, power optimizers, and module-level metering units. FIG. 6 identifies elements of these methods. Many elements are exemplary and, depending on the situations, can be readily changed, curtailed, extended and fine-tuned to accommodate various scenarios described throughout the description.

Considered parameters for solar systems that employ methods and designs described herein may include none, some or all of the following: GPS location installation topography; location of the modules; series parallel string combination; string layout; orientation of the modules; individual module characteristic; location specific static shadowing object profiles; and historical irradiation data for the location.

Real-time or almost real-time availability of data for solar systems can include some of the following: data from solar module electronics; data from other solar power plants; available voltage, current, temperature; available control loop and other parameters such as voltage ratio; available temperature from the smart modules; current irradiation at the solar array using a pyranometer; and current temperature at the solar array; and current weather meteorology at the neighboring weather stations.

Due to the predictive nature of the algorithm for determination of shadow encroachment, the gateway or the server carrying out the algorithms allow additional functionality where it can instruct the power optimizers to change their characteristics so that when the shadowing event occurs, the centralized inverter continues to have enough headroom and operates optimally without disruption.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An automated method of solar array service diagnostics, the automated method comprising:
   receiving ongoing data for a first solar array system at a controller of the first solar array system, the ongoing data indicating performance of one or more photovoltaic modules of the first solar array system and indicating environmental conditions of the first solar array system,
   each photovoltaic module of the first solar array system comprising a solar panel,
   the first solar array system further comprising an inverter electrically connected to receive and convert DC voltage from one or more solar panels of the first solar array system,
   the first solar array system outputting a cumulative system AC output voltage, the cumulative AC output voltage output by the first solar array system to a first user, the cumulative system AC output voltage of the first solar array system suitable for directly feeding into a power grid;
   receiving at the controller operational performance data for a second solar array system,
   the second solar array system comprising a plurality of electrically connected solar panels and at least one inverter electrically connected to receive and convert DC voltage from one or more solar panels of the second solar array system, the second solar array system outputting a cumulative system AC output voltage, the cumulative system AC output voltage output by the second solar array system to a second user, the cumulative system AC output voltage of the second solar array system suitable for directly feeding into a power grid;
   the second solar array system operating concurrently with the operation of the first solar array system, the first and second solar array systems being physically separated from each other, being electrically unconnected to each other, and each being discrete solar power systems;
   the controller using the received ongoing data from the first solar array system and the received operational performance data from the second solar array system to generate a predicted performance related to the first solar array system;
   comparing the predicted performance related to the first solar array to actual first solar array performance data to generate comparison data and to determine if service is needed;
   the controller analyzing the comparison data to determine a type of service needed, if service is needed; and
   the controller configured to use ongoing data of the first solar array to determine if a shadowing event is occurring and to instruct a power optimizer of the first solar array to change its voltage ratio output characteristics during a shadowing event.

2. The method of claim 1 further comprising:
   generating a service request or service alert for the type of service needed for the first solar array system when service is needed.

3. The method of claim 1 further comprising:
   receiving weather data for weather affecting performance of photovoltaic modules of the first solar array system;
   wherein the received contemporary data indicates the real-time performance of the first solar array system.

4. The method of claim 1 further comprising:
   receiving data from one or more weather stations and using the received data to determine solar intensity.

5. The method of claim 1 further comprising:
   determining that dirt or debris has accumulated on one or more solar panels of the first solar array by monitoring power output of two or more photovoltaic modules of the first solar array system and comparing the rate of output change between the two photovoltaic modules.

6. The method of claim 1 further comprising:
   comparing instantaneous power output of one photovoltaic module of the first solar array system to another photovoltaic module of the first solar array system and degradation of power output is found in the comparison between the two photovoltaic modules, determining that a sudden accumulation of debris has impacted the first solar array system.

7. The method of claim 1 further comprising:
   determining if a photovoltaic module of the first solar array system is uniformly or nonuniformly shaded by comparing variations in the voltage ratio used by a power optimizer of the first solar array system.

8. The method of claim 1 further comprising:
   receiving weather data for weather affecting performance of photovoltaic modules of the first solar array system.

9. The method of claim 8 wherein the weather data comprises temperature or irradiation or both, and wherein configuration data of distributed electronics comprising the first solar array system is gathered to determine the configuration of the distributed electronics of the first solar array system.

10. The method of claim 1 further comprising:
determining worsening power output from the first solar array system by determining the power output of the second solar array system and correlating the power output between the first solar array system and the second solar array system.

11. A system configured for automated determination of whether service is needed on a first solar array, the system having one or more processors configured to perform a method comprising:
receiving ongoing data for a first solar array system, the ongoing data indicating performance of photovoltaic modules of the first solar array system;
receiving operational performance data from a second solar array system,
the second solar array system operating in its own solar installation located apart from the first solar array system, the second solar array system operating concurrently with the operation of the first solar array system, the second solar array system electrically unconnected to the first solar array system,
the first array system and the second array system each outputting cumulative system AC voltages generated by the respective array system to a different power consumer where the output AC voltages of each system are suitable for feeding into a power grid,
using ongoing data from the first solar array system and operational performance data of the second solar array to generate a predicted performance for the first solar array;
comparing the generated predicted performance for the first solar array to the received ongoing data from the first solar array system to determine if service is needed for the first solar array system;
and
using received ongoing data of the first solar array system to determine if a shadowing event is occurring and to instruct a power optimizer of the first solar array system to change its voltage ratio output characteristics during a shadowing event.

12. The system of claim 11 wherein the one or more processors are further configured to:
receive weather data for weather affecting performance of photovoltaic modules of the first solar array system, and
wherein the received ongoing data indicates the real-time performance of the first solar array system and the received weather data indicates weather affecting the real-time performance of the first solar array system.

13. The system of claim 12 wherein the weather data comprises temperature or irradiation or both, and wherein configuration data of the distributed electronics comprising the first solar array system is gathered before receiving ongoing data from the first solar array system.

14. The system of claim 11 wherein the one or more processors are further configured to:
receive data from one or more weather stations and using the received data to determine solar intensity.

15. The system of claim 11 wherein the one or more processors are further configured to:
determine that dirt or debris has accumulated on one or more panels of the first solar array system by monitoring power output of two or more photovoltaic modules of the first solar array system and comparing the rate of output change between the two photovoltaic modules.

16. The system of claim 11 wherein the one or more processors are further configured to:
compare instantaneous power output of one photovoltaic module of the first solar array system to another photovoltaic module of the first solar array system and degradation of power output is found in the comparison between the two photovoltaic modules, determining that a sudden accumulation of debris has impacted the first solar array system.

17. The system of claim 11 wherein the one or more processors are further configured to:
determine if a photovoltaic module of the first solar array system is uniformly or nonuniformly shaded by comparing variations in the voltage ratio used by a power optimizer of the first solar array system.

18. The system of claim 11 wherein the one or more processors are further configured to:
determine worsening power output from the first solar array system by determining the power output of the second solar array system and correlating the power output between the first solar array system and the second solar array system.

19. The system of claim 11 wherein the type of service comprises landscaping services or solar panel cleaning services.

20. The system of claim 11 wherein the one or more processors are further configured such that the method performed further comprises:
using received ongoing data from the first solar array system, weather data and operational performance data of the second solar array to generate a predicted performance for the first solar array system;
analyzing the comparison data to determine a type of service needed, if service is needed; and
if service is needed, generating an electronically transmittable service request or an electronically transmittable service alert for the type of service needed for the first solar array system,
wherein the second solar array system is operating in an environment having a first environmental attribute and a second environmental attribute that correspond to first and second attributes of the environment of the first solar array system and/or the second solar array system having a first characteristic and a second characteristic that correspond to first and second characteristics of the first solar array system.

* * * * *